United States Patent [19]

Yamada et al.

[11] Patent Number: 5,742,296
[45] Date of Patent: Apr. 21, 1998

[54] IMAGE PROCESSING METHOD AND APPARATUS THEREFOR

[75] Inventors: Osamu Yamada, Yokohama; Susumu Sugiura, Atsugi; Yoshizumi Yasuda, Kashiwa, all of Japan

[73] Assignee: Canon Kabushiki Kaisha, Tokyo, Japan

[21] Appl. No.: 479,859

[22] Filed: Jun. 7, 1995

Related U.S. Application Data

[63] Continuation of Ser. No. 998,865, Dec. 30, 1992, abandoned.

[30] Foreign Application Priority Data

Jan. 8, 1992 [JP] Japan .................................. 4-001566

[51] Int. Cl.$^6$ ................................................. H04N 1/46
[52] U.S. Cl. ............................................................ 345/431
[58] Field of Search ...................... 395/131, 132; 358/75, 76, 80, 501

[56] References Cited

U.S. PATENT DOCUMENTS

| | | | |
|---|---|---|---|
| 4,751,535 | 6/1988 | Myers | 358/80 X |
| 4,758,885 | 7/1988 | Sasaki et al. | 358/80 X |
| 4,862,254 | 8/1989 | Takada | 358/434 |
| 4,862,282 | 8/1989 | Nakajima | 358/434 |
| 4,884,130 | 11/1989 | Huntsman | 358/80 X |
| 4,887,151 | 12/1989 | Wataya | 358/80 |
| 4,959,711 | 9/1990 | Hung et al. | 358/80 X |
| 4,992,861 | 2/1991 | D'Errico | 358/80 |
| 5,018,008 | 5/1991 | Asada | 358/80 |
| 5,073,818 | 12/1991 | Iida | 358/80 |
| 5,103,407 | 4/1992 | Gabor | 395/131 |
| 5,231,504 | 7/1993 | Magee | 358/75 |
| 5,233,684 | 8/1993 | Ulichney | 395/131 |
| 5,276,779 | 1/1994 | Statt | 395/131 X |
| 5,307,452 | 4/1994 | Hahn et al. | 395/131 X |
| 5,309,257 | 5/1994 | Bonino et al. | 395/131 X |
| 5,311,212 | 5/1994 | Beretta | 395/131 X |
| 5,313,291 | 5/1994 | Appel et al. | 358/501 X |
| 5,408,595 | 4/1995 | Tajima | 395/131 |

FOREIGN PATENT DOCUMENTS 2132971  5/1990  Japan .

Primary Examiner—Phu K. Nguyen
Assistant Examiner—Cliff N. Vo
Attorney, Agent, or Firm—Fitzpatrick, Cella, Harper & Scinto

[57] ABSTRACT

An image processing method for executing image data conversion between different types of input and output devices having different color reproduction ranges, and an apparatus therefor are disclosed. A device independent color reproduction range is calculated in, e.g., a CIE L*a*b* uniform color space, and a color reproduction range depending on a device such as a binary recording color printer is calculated. Only a saturation is compressed at a compression ratio corresponding to the ratio of the two calculated color reproduction ranges. Thus, when an output device outputs a color image, image qualities (color reproducibilities) of input and output images can be equalized. Even when a color outside the color reproduction range of the output device is to be output, a satisfactory output which preserves gradation characteristics can be obtained.

52 Claims, 16 Drawing Sheets

LINEAR COMPRESSION

NONLINEAR COMPRESSION

REGION COMPRESSION

PASTE COMPRESSION

IMAGE PROCESSING METHOD AND APPARATUS THEREFOR

This application is a continuation of application Ser. No. 97/998,865 filed Dec. 30, 1992, now abandoned.

BACKGROUND OF THE INVENTION

1. Field of the Invention

The present invention relates to an image processing method suitable for color image communications among different types of input/output devices, and an apparatus therefor.

2. Description of the Related Art

Conventionally, color image communications among different types of input/output (I/O) devices having different color reproduction ranges are performed. For example, a color image read by a color image scanner is output by a color printer. In such an image communication, color conversion processing for converting color image signals from an input device into color signals for an output device, masking processing for correcting unnecessary absorption of inks of a color printer, and the like are performed.

However, although I/O devices have different color reproduction ranges, image processing (including color space conversion) considering the color reproduction ranges of the respective I/O devices is not executed, and the following problems are posed.

Input and output images have different image qualities (color reproducibilities).

When a color outside the color reproduction range of an output device is to be output, gradation characteristics are deteriorated.

SUMMARY OF THE INVENTION

The present invention has been made to solve the above-mentioned problems, and has as its object to provide an image processing method, which can match image qualities (image reproducibilities) of input and output images when an output device outputs a color image, and can obtain a good output which preserves gradation characteristics even when a color outside a color reproduction range of an output device is to be output, and an apparatus therefor.

As means for achieving the above object, the present invention comprises the following arrangement.

More specifically, there is provided an image processing method for executing image data conversion between input and output devices having different color reproduction ranges, comprising the steps of:

calculating a first color reproduction range which is independent of a device; calculating a second color reproduction range which depends on the output device; and executing color space conversion between the first and second color reproduction ranges.

There is also provided an image processing apparatus for executing image data conversion between input and output devices having different color reproduction ranges, comprising: first calculation means for calculating a first color reproduction range which is independent of a device; second calculation means for calculating a second color reproduction range which depends on the output device; and conversion means for executing color space conversion between the first and second color reproduction ranges.

With the above-mentioned arrangement, when a color image is output from an output device, image qualities (color reproducibilities) of input and output images can be matched upon execution of image processing including color space conversion, and even when a color outside the color reproduction range of an output device is to be output, a good output which preserves gradation characteristics can be obtained.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Prior to a description of the preferred embodiment of the present invention, a method of calculating a device independent color reproduction range based on visual characteristics of man will be explained below.

In this case, the calculation of the device independent color reproduction range is executed in a CIE1976 $L^*a^*b$, uniform color space presented by the CIE (Commission international de l'Eclairage). The color reproduction range can be obtained by calculating the most vivid colors in units of lightnesses and hues.

Figure 11:
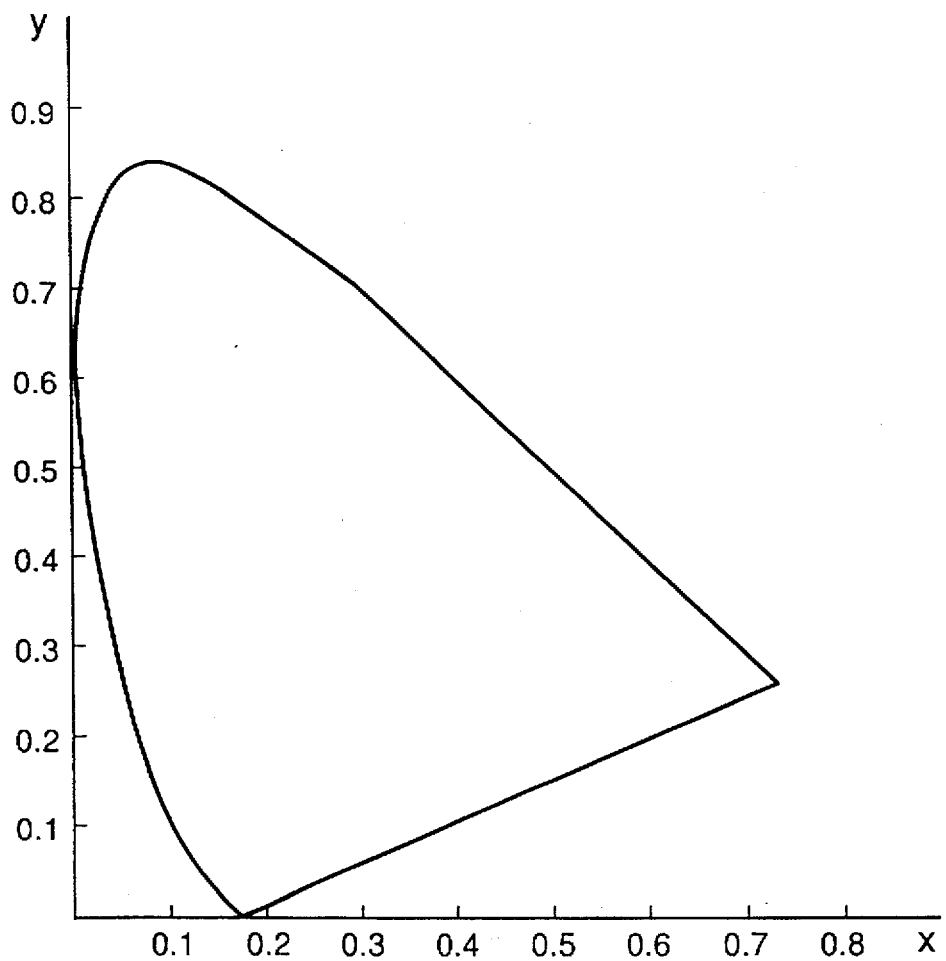
FIG. 11 is an xy chromaticity diagram showing a spectral locus.

FIG. 11 is an xy chromaticity diagram showing a spectral locus. A region inside the spectral locus represents existing colors, that is, colors that can be seen by the visual sense of man.

Figure 12:
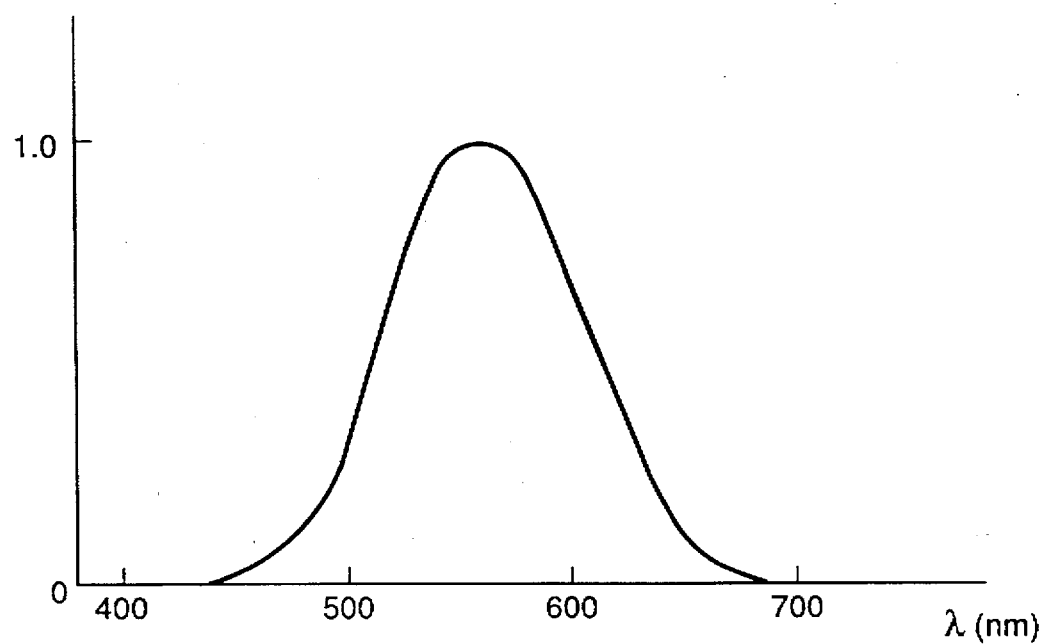
FIG. 12 is a graph showing standard spectral luminous efficiency characteristics presented by the CIE.

FIG. 12 is a graph showing standard spectral luminous efficiency characteristics presented by the CIE. This data corresponds to $\bar{y}(\lambda)$ of an XYZ colorimetric system, and values in units of wavelength $\lambda=1$ nm are presented by the CIE. The most vivid colors in units of lightnesses and hues are calculated using this spectral luminous efficiency characteristic curve.

Figure 13:
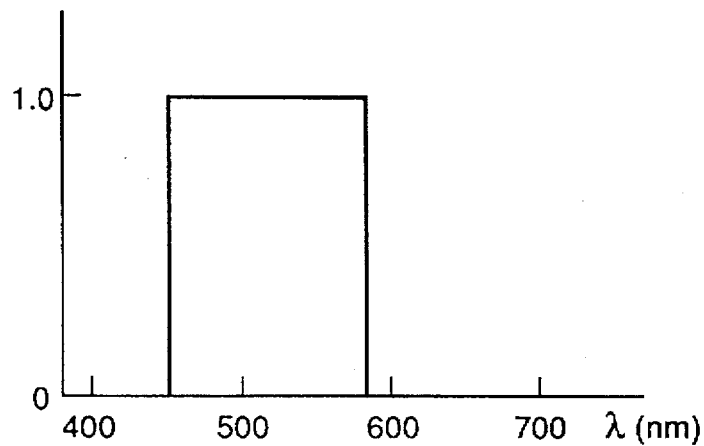
FIGS. 13A and 13B are graphs showing spectral reflectance characteristics that provide the most vivid color.
Figure 13:
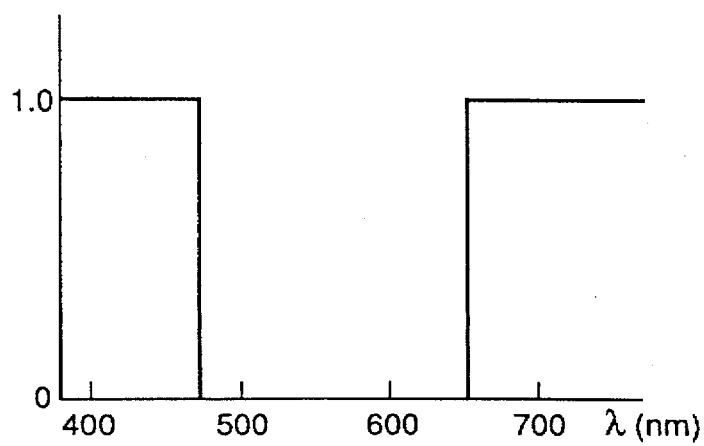
Figure 14:
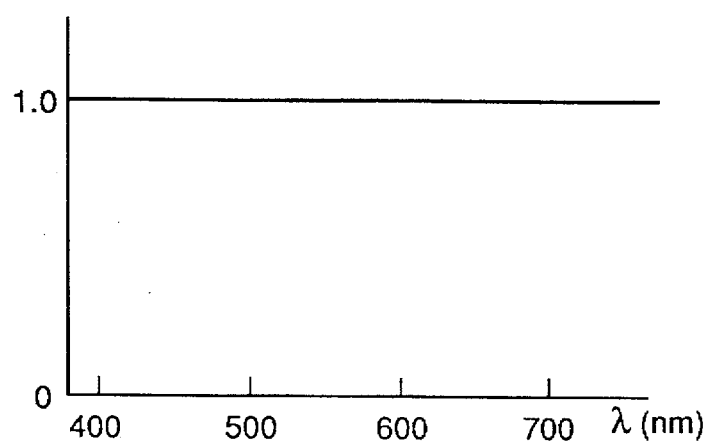
FIG. 14 is a graph showing spectral emissivity characteristics of an ideal light source.

The spectral characteristics that provide the most vivid color have spectral reflectances of only 0 and 1.0, as shown in FIG. 13A or 13B. In the case of an ideal light source which has a spectral emissivity of 1.0 over the entire wavelength range, as shown in FIG. 14, colorimetric values of a color having the distribution shown in FIG. 13A or 13B are calculated by the following formulas (1):

$$X = K \int_{380}^{780} S(\lambda)R(\lambda)\bar{x}(\lambda)d\lambda \\ Y = K \int_{380}^{780} S(\lambda)R(\lambda)\bar{y}(\lambda)d\lambda \\ Z = K \int_{380}^{780} S(\lambda)R(\lambda)\bar{z}(\lambda)d\lambda$$  (1)

where $S(\lambda)$: spectral emissivity (=1.0) of light source $R(\lambda)$: spectral reflectance of object color $\bar{x}(\lambda)$, $\bar{y}(\lambda)$, $\bar{z}(\lambda)$: color matching functions $$K = \frac{100}{\int_{380}^{780} S(\lambda)\bar{y}(\lambda)d\lambda}$$

On the other hand, the XYZ colorimetric system is converted into an L*a*b* colorimetric system according to the following formulas (2):

$$L^* = 116\sqrt[3]{Y/Yn} - 16 \\ a^* = 500\left(\sqrt[3]{X/Xn} - \sqrt[3]{Y/Yn}\right) \\ b^* = 200\left(\sqrt[3]{Y/Yn} - \sqrt[3]{Z/Zn}\right)$$  (2)

where
X/Xn>0.008856
Y/Yn>0.008856
Z/Zn>0.008856

Xn, Yn, Zn: tri-stimulus values of perfect diffusion surface

In the L*a*b* colorimetric system, a lightness V, a hue $\theta$, and a saturation $\gamma$ are respectively defined by formulas (3):

$$V = L^* \\ \theta = \tan^{-1}\frac{b^*}{a^*} = \sin^{-1}\frac{b^*}{\gamma} = \cos^{-1}\frac{a^*}{\gamma} \\ \gamma = \sqrt{a^{*2} + b^{*2}}$$  (3)

for $a^* \neq 0$, $\gamma \neq 0$

For example, a method of calculating a device independent color reproduction range when a lightness V=30 will be explained below.

In this case, from formulas (3), L*=30, and Y that yields L*=30 is Y=6.24 from formulas (2). Thus, R($\lambda$) which yields Y=6.24 can be calculated from formulas (1).

Since a color having a spectral reflectance distribution shown in FIG. 13A has two transition wavelengths of the spectral reflectance, a short transition wavelength is fixed at 380 nm, and a long transition wavelength is increased by 1 nm like 381, 382, . . . . At each wavelength $\lambda$, the value Y is calculated according to formulas (1), and the long transition wavelength exhibiting a value Y closest to 6.24 is searched. Thus, since the spectral reflectance distribution of an object color at the short transition wavelength of 380 nm is determined, the values X and Z are calculated using formulas (1), and the values a* and b* are calculated using formulas (2). Thereafter, the hue $\theta$ and the saturation $\gamma$ are calculated using formulas (3).

With the above-mentioned procedure, one coordinatevalue of the most vivid color in the hue $\theta$ including the lightness V=30 is determined. Then, the short transition wavelength is increased by 1 nm like 381, 382, . . . , and corresponding long transition wavelengths can be calculated.

Since a color having the spectral reflectance distribution shown in FIG. 13B also has two transition wavelengths of the spectral reflectance, the spectral reflectance distribution of an object color can be determined by the same method as described above, and the hue $\theta$ and the saturation $\gamma$ can be calculated.

Figure 2:
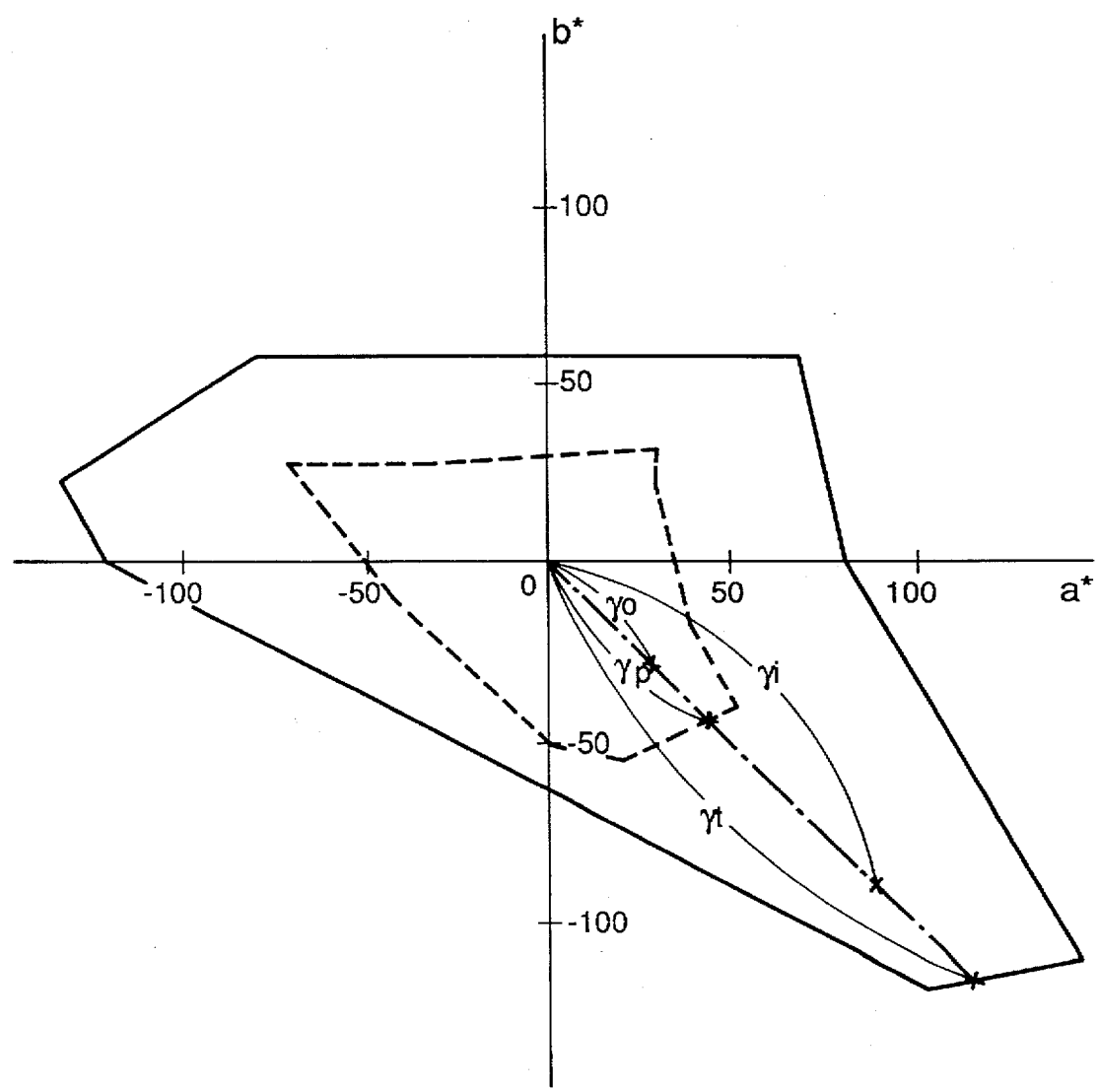
FIG. 2 is a graph showing a color reproduction range at a lightness V=30 on an $a^*b^*$ coordinate system.

Since the coordinate points of the most vivid colors in various hues $\theta$ can be calculated by the above-mentioned method, a theoretical color reproduction range when the lightness V=30 can be derived by connecting these coordinate points, as indicated by a solid curve in FIG. 2.

When the value of the lightness V is changed like 1, 2, 3, . . . , 50, . . . , 98, and 99, device independent color reproduction ranges corresponding to all the lightnesses and hues can be derived.

A method of calculating a device dependent color reproduction range will be explained below. In the following description, a binary recording color printer is assumed as an output device.

Figure 15:
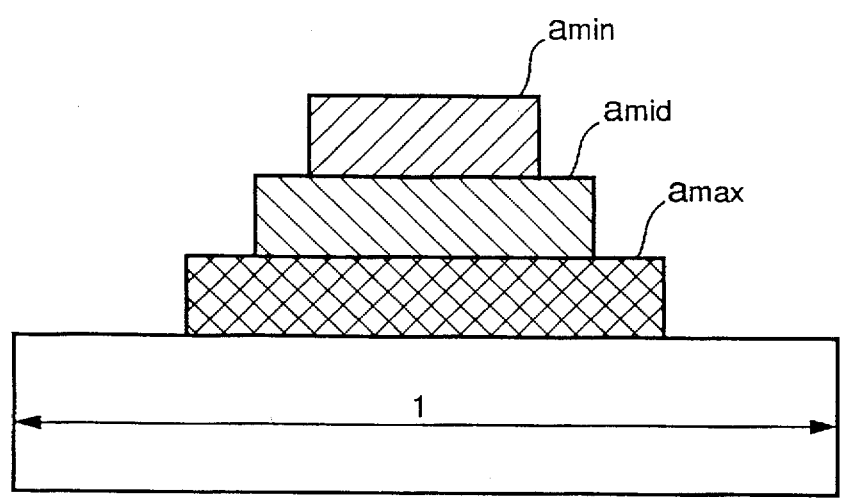
FIG. 15 is a view showing a binary recording model.

FIG. 15 shows a binary recording model. In FIG. 15, the area ratio of a three-color overlapping portion is represented by $a_{min}$, the area ratio of a two-color overlapping portion is represented by $a_{mid}$, the area ratio of a single-color portion is represented by $a_{max}$, and the tri-stimulus values of the respective color portions are respectively represented by X1, Y1, and Z1; X2, Y2, and Z2; and X3, Y3, and Z3. Similarly, if the tri-stimulus values of recording paper are represented by Xp, Yp, and Zp, total stimulus values X, Y, and Z are expressed by formulas (4):

$$X = \{1 - (a_{min} + a_{mid} + a_{max})\}Xp + a_{min}X1 + a_{mid}X2 + a_{max}X3 \\ Y = \{1 - (a_{min} + a_{mid} + a_{max})\}Yp + a_{min}Y1 + a_{mid}Y2 + a_{max}Y3 \\ Z = \{1 - (a_{min} + a_{mid} + a_{max})\}Zp + a_{min}Z1 + a_{mid}Z2 + a_{max}Z3$$  (4)

Since color recording is normally expressed by subtractive primaries, if the primaries are cyan, magenta, and yellow, and the recording area ratios of these colors are represented by c, m, and y, relations among these colors are expressed by formulas (5), and L*, a*, and b* of the respective colors are obtained by substituting the results of formulas (4) into formulas (2):

$$y \geq m \geq c : a_{min} = c, a_{mid} = m - c, a_{max} = y - m, a_p = 1 - y \\ m \geq c \geq y : a_{min} = y, a_{mid} = c - y, a_{max} = m - c, a_p = 1 - m \\ c \geq y \geq m : a_{min} = m, a_{mid} = y - m, a_{max} = c - y, a_p = 1 - c \\ y \geq c \geq m : a_{min} = m, a_{mid} = c - m, a_{max} = y - c, a_p = 1 - y \\ m \geq y \geq c : a_{min} = c, a_{mid} = y - c, a_{max} = m - y, a_p = 1 - m \\ c \geq m \geq y : a_{min} = y, a_{mid} = m - y, a_{max} = c - m, a_p = 1 - c$$  (5)

When the tri-stimulus values associated with the solid densities of the primaries of an output device such as a color printer and the solid densities of secondary and tertiary colors of the primaries are obtained, the device dependent color reproduction range can be estimated according to formulas (4). More specifically, the longest chromaticity points in units of hues θ at each lightness V are calculated by changing the recording area ratios c, m, and y of the primaries within a range of $0 \leq c, m, y \leq 1$, thereby obtaining outermost points. A plane surrounded by a line connecting the outermost points, i.e., a broken line in FIG. 2, is the device dependent color reproduction range.

An image processing apparatus according to an embodiment of the present invention will be described below.

Figure 1:
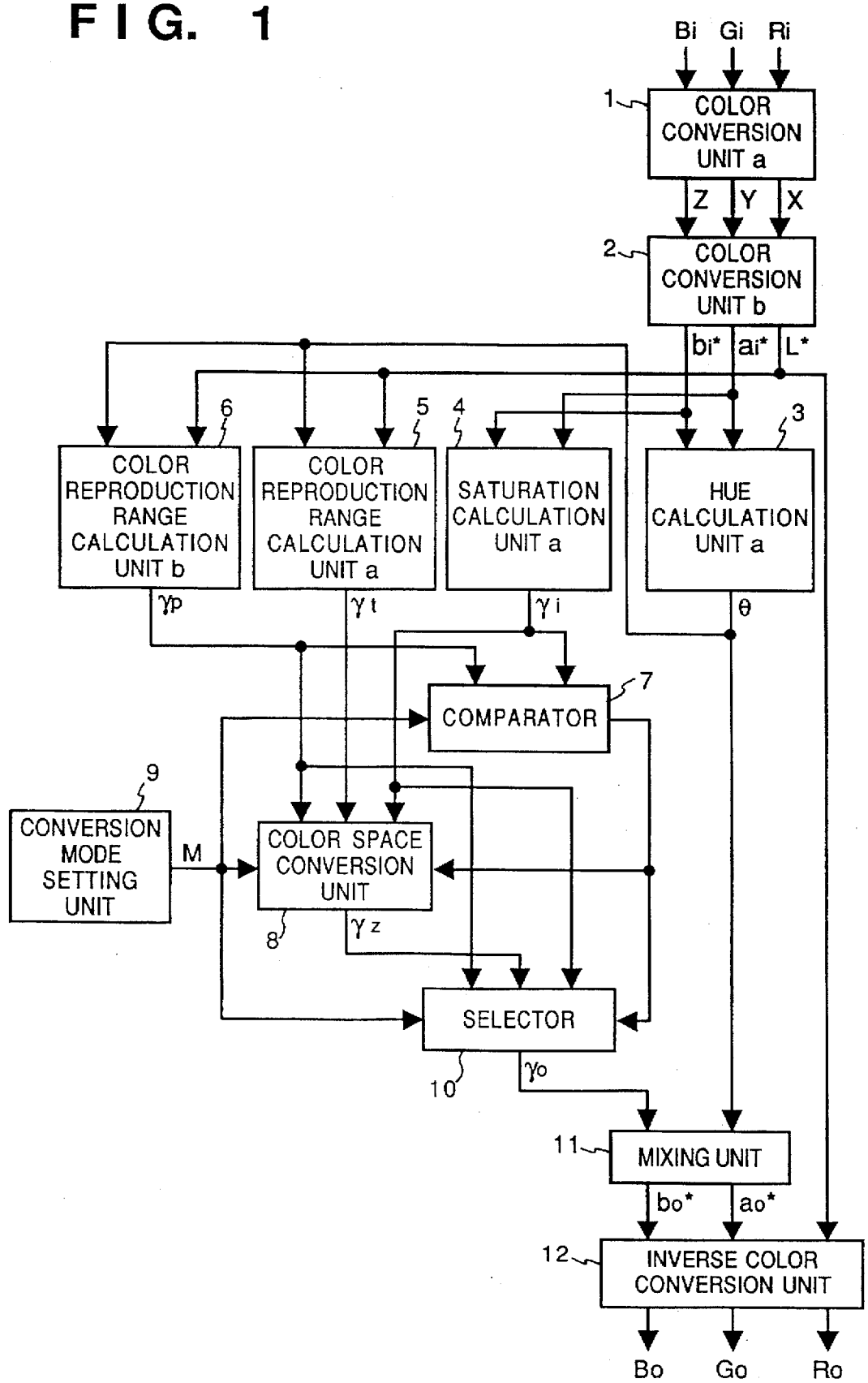
FIG. 1 is a block diagram showing an arrangement of an image processing apparatus according to an embodiment of the present invention.

FIG. 1 is a block diagram showing an arrangement of this embodiment.

Referring to FIG. 1, reference numeral 1 denotes a color conversion unit a for converting color signals Ri, Gi, and Bi into color signals X, Y, and Z.

Reference numeral 2 denotes a color conversion unit b for converting the color signals X, Y, and Z input from the color conversion unit a1 into color signals L*, ai*, and bi*.

Reference numeral 3 denotes a hue calculation unit a; and 4, a saturation calculation unit a. The hue calculation unit a3 and the saturation calculation unit a4 respectively calculate a hue θ and a saturation $\gamma_i$ on the basis of the chromaticities ai* and bi* input from the color conversion unit b2 according to conversion formulas (3).

Reference numeral 5 denotes a color reproduction range calculation unit a; and 6, a color reproduction range calculation unit b. Although the details of their arrangements will be described later, the color reproduction range calculation unit a5 calculates a device independent color reproduction range from a lightness L* input from the color conversion unit b2 and the hue θ input from the hue calculation unit a3 in units of lightnesses and hues using the above-mentioned method of calculating the device independent color reproduction range, and the color reproduction range calculation unit b6 calculates a color reproduction range depending on an output device such as a color printer in units of lightnesses and hues using the above-mentioned method of calculating the device dependent color reproduction range.

Reference numeral 7 denotes a comparator a for comparing a saturation $\gamma_i$ input from the saturation calculation unit a4 with a saturation $\gamma_p$ input from the color reproduction range calculation unit b6 and corresponding to the lightness and hue in accordance with a mode M set by a conversion mode setting unit 9 to check if the input color signals fall within the color reproduction range of an output device.

Reference numeral 8 denotes a color space conversion unit for converting the saturation $\gamma_i$ of the input color signal into a value within the saturation $\gamma_p$ of the output device according to the mode M set by the conversion mode setting unit 9 using the saturation $\gamma_i$ input from the saturation calculation unit a4, a saturation $\gamma_t$ input from the color reproduction range calculation unit a5, and the saturation $\gamma_p$ input from the color reproduction range calculation unit b6.

Reference numeral 9 denotes a conversion mode setting unit for setting a color conversion method. The details of the conversion mode setting unit 9 will be described later.

Reference numeral 10 denotes a selector for selecting one of the saturation $\gamma_i$ input from the saturation calculation unit a4, the saturation $\gamma_p$ input from the color reproduction range calculation unit b6, and a saturation $\gamma_2$ input from the color space conversion unit 8 according to the mode M set by the conversion mode setting unit 9 and the comparison result from the comparator a7, and outputting the selected saturation as a final saturation $\gamma_o$.

Reference numeral 11 denotes a mixing unit for calculating chromaticities $a_o^*$ and $b_o^*$ from the hue θ input from the hue calculation unit a3 and the saturation $\gamma_0$ input from the selector 10.

Reference numeral 12 denotes an inverse color conversion unit for converting a signal L* input from the color conversion unit b2 and signals $a_o^*$ and $b_o^*$ input from the mixing unit 11 into signals $R_o$, $G_o$, and $B_o$.

Input color signals $R_i$, $G_i$, and $B_i$ are converted into color signals X, Y, and Z by the color conversion unit a1 according to, e.g., the following linear conversion formulas (6):

$$X = a_{11}R_i + a_{12}G_i + a_{13}B_i$$
$$Y = a_{21}R_i + a_{22}G_i + a_{23}B_i \quad (6)$$
$$Z = a_{31}R_i + a_{32}G_i + a_{23}B_i$$

The color signals X, Y, and Z output from the color conversion unit a1 are converted into color signals L*, $a_i$, and $b_i^*$ by the color conversion unit b2 according to formulas (2). The color signals L*, $a_i^*$, and $b_i^*$ are respectively converted into a hue θ and a saturation $\theta_i$ of the input color signals by the hue and saturation calculation units a3 and a4 according to formulas (3).

The lightness L* and the hue θ are input to the color reproduction range calculation unit a5, and the unit a5 calculates a saturation $\gamma_t$ of a device independent color reproduction range corresponding to the input lightness and hue by the above-mentioned method.

The lightness L* and the hue θ are also input to the color reproduction range calculation unit b6, and the unit b6 calculates a saturation $\gamma_p$ of a device dependent color reproduction range corresponding to the input lightness and hue by the above-mentioned method. As will be described in detail later, the calculation results of the color reproduction range calculation unit b6 are pre-stored in its internal memory (e.g., a ROM, an EEPROM, or the like), and the memory is accessed according to the input lightness L* and hue θ, thereby selecting the saturation $\gamma_p$ of the color reproduction range of the output device corresponding to the input lightness and hue.

The saturation $\gamma_i$ of the input color signals, the saturation $\gamma_t$ of the device independent color reproduction range, and the saturation $\gamma_p$ of the color reproduction range of the output device are input to the color space conversion unit 8, and the saturation $\gamma_i$ is compressed to fall within the saturation $\gamma_p$. In this embodiment, four different compression methods are available, and the saturation $\gamma_i$ is compressed by a compression method according to the mode M set by the conversion mode setting unit 9.

FIG. 2 is a graph showing a color reproduction range at a lightness V=30 on an a*b* coordinate system. In FIG. 2, a device independent color reproduction range is indicated by a solid line, and a reproduction range of an output device is indicated by a broken line.

Since the saturation $\gamma_i$ of the input color signals satisfies $\gamma_i > \gamma_p$, it cannot be expressed by the output device. Thus, in order to preserve color gradation characteristics in a region satisfying $\gamma_i > \gamma_p$, the saturation $\gamma_i$ of the input color signals must be compressed to a value within the color reproduction range of the output device, i.e., inside the broken line. However, since the maximum saturation that the input color signals can assume is unknown, the device independent color reproduction range is calculated in this embodiment, and is presumed as the maximum saturation that the input color signals can assume, thereby compressing the saturation.

In this embodiment, the following compression methods are available. However, the present invention is not limited to these methods, and any other methods may be adopted.

Figure 3:
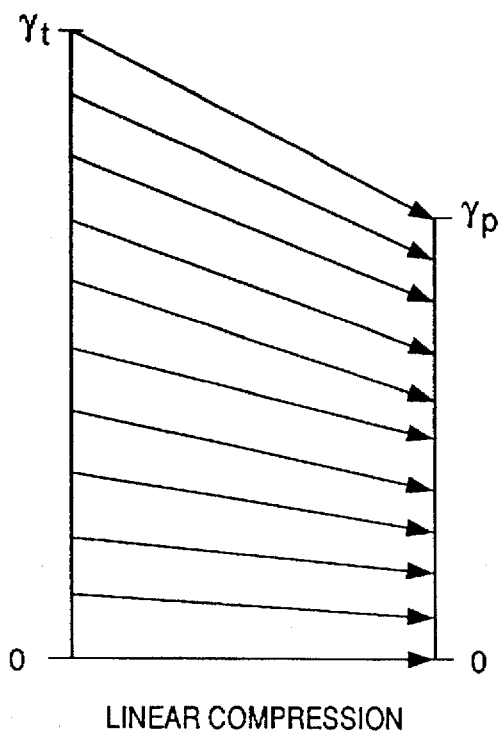
FIGS. 3 to 6 are views for explaining compression methods in a color space converter 8 shown in FIG. 1.
Figure 4:
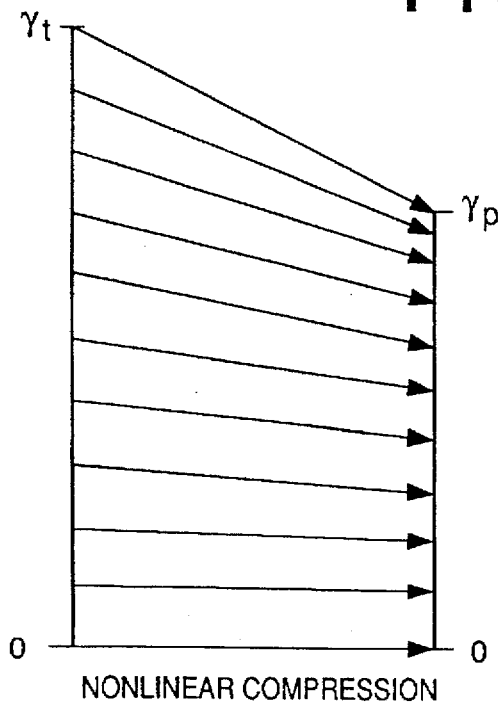
Figure 5:
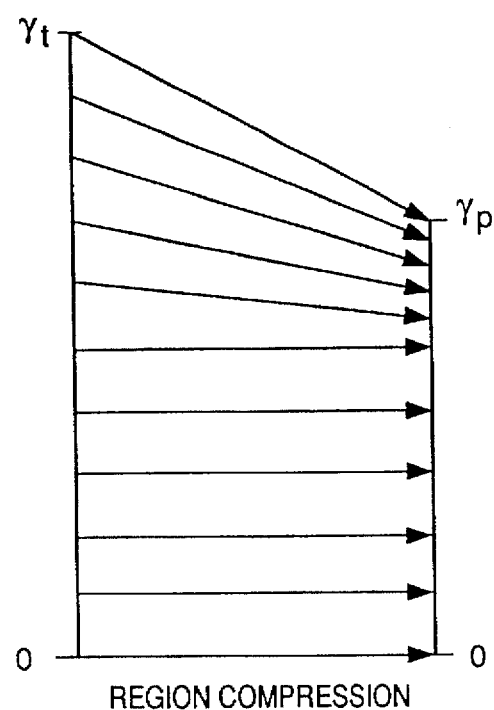
Figure 6:
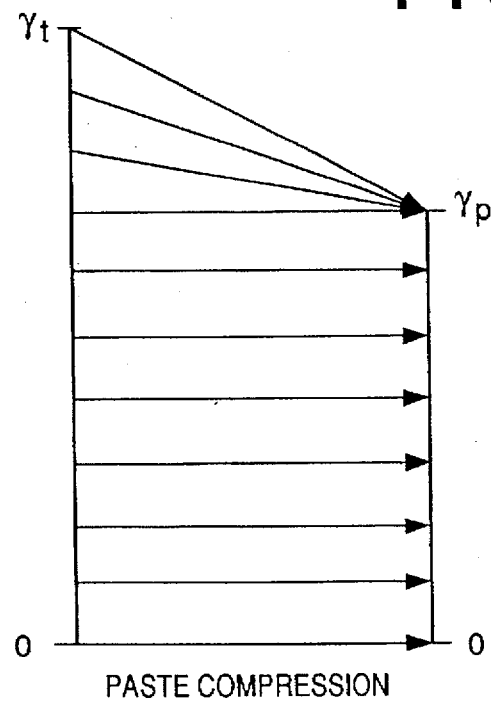

1. Linear Compression (FIG. 3)

$\gamma_o = \gamma_2 = \gamma_i(\gamma_p/\gamma_t)$

2. Nonlinear Compression (FIG. 4)
$\gamma_0 = \gamma_2 = \gamma_1\{1-(1-\gamma_p/\gamma_t)^{\gamma_i/\gamma_i}\}$ 3. Region Compression (FIG. 5)
When $\gamma_i \leq \alpha\gamma_p$, $\gamma_0 = \gamma_i$ When $\gamma_i > \alpha\gamma_p$, $\gamma_0 = \gamma_2 = \dfrac{(\gamma_i - \alpha\gamma_p)(\gamma_p - \alpha\gamma_p)}{\gamma_t - \alpha\gamma_p} + \alpha\gamma_p$ 4. Paste Compression (FIG. 6)
When $\gamma_i \leq \gamma_p$, $\gamma_0 = \gamma_i$
When $\gamma_i > \gamma_p$, $\gamma_0 = \gamma_p$ Note that FIGS. 3 to 6 are views for explaining the above-mentioned compression methods.

In this manner, the saturations $\gamma_i$ and $\gamma_p$ are compared with each other by the comparator a7 according to the mode M (one of the above-mentioned four compression methods) set by the conversion mode setting unit 9, and a saturation $\gamma_2$ after color space conversion according to the comparison result and the mode M is output from the color space conversion unit 8. Furthermore, one of the saturations $\gamma_i, \gamma_p$, and $\gamma_2$ is selected by the selector 10 according to the comparison result and the mode M, and the selected saturation is output as a final saturation $\gamma_o$.

The saturation $\gamma_o$ is input to the mixing unit 11 together with the hue $\theta$, and chromaticities $a_o^*$ and $b_o^*$ after color space conversion are calculated according to formulas (7):

$$a_o^* = \gamma_o\cos\theta \atop b_o^* = \gamma_o\sin\theta \qquad (7)$$

The chromaticities $a_o^*$ and $b_o^*$ and the lightness L* are converted into color signals $R_o$, $G_o$, and $B_o$ by the inverse color conversion unit 12. This conversion can be realized by inverse conversions of formulas (2) and (6).

Figure 7:
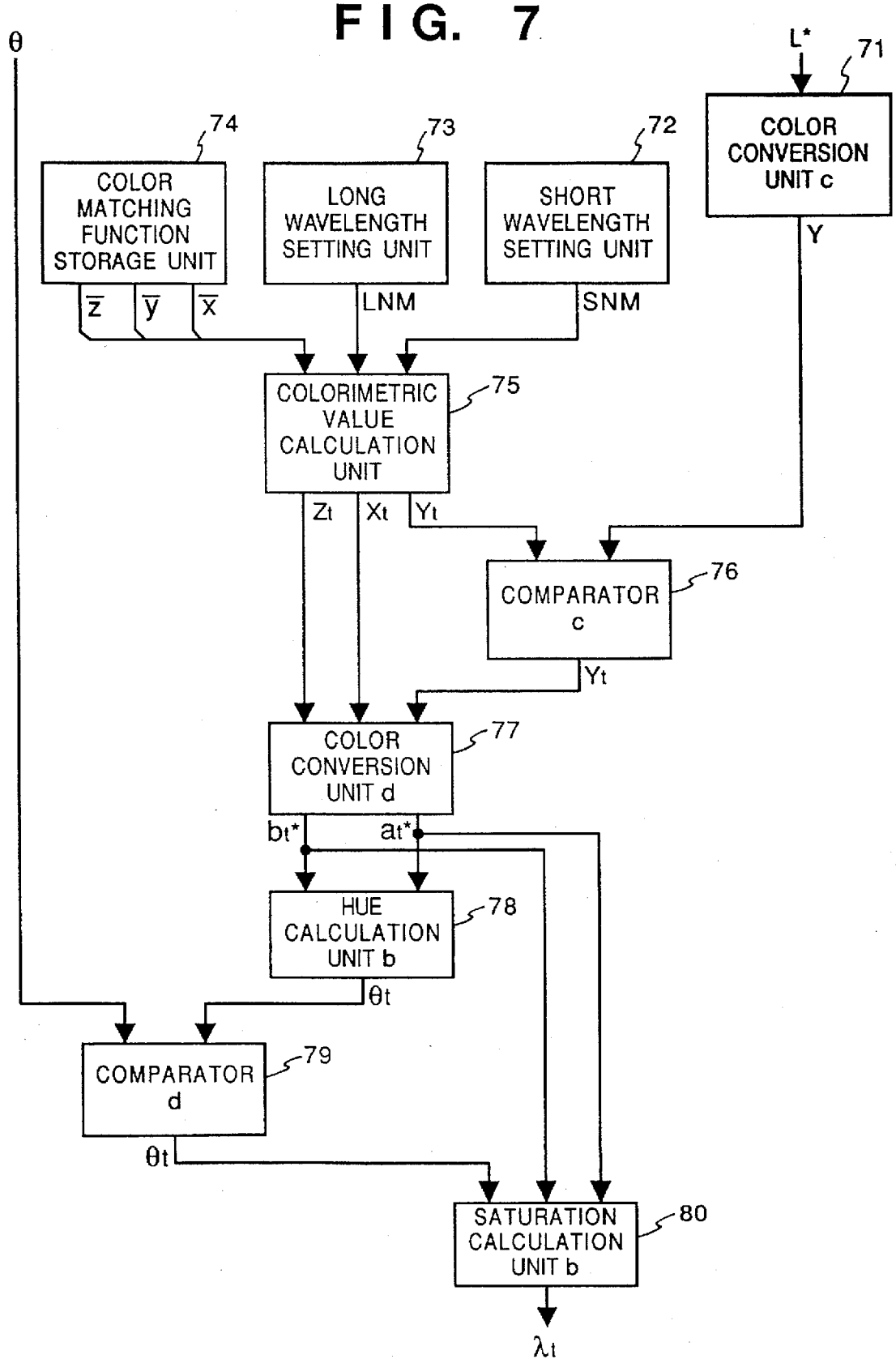
FIG. 7 is a block diagram showing an arrangement of a color reproduction range calculation unit a5 shown in FIG. 1.

FIG. 7 is a block diagram showing an arrangement of the color reproduction range calculation unit a5.

Referring to FIG. 7, reference numeral 71 denotes a color conversion unit c for converting the lightness L* into a stimulus value Y according to formulas (2).

Reference numeral 72 denotes a short wavelength setting unit; and 73, a long wavelength setting unit. These setting units 72 and 73 respectively set a short transition wavelength SNM and a long transition wavelength LNM.

Reference numeral 74 denotes a color matching function storage unit for storing CIE color matching functions $\bar{x}(\lambda)$, $\bar{y}(\lambda)$, and $\bar{z}(\lambda)$ in units of 1 nm.

Reference numeral 75 denotes a colorimetric value calculation unit for integrating the color matching functions $\bar{x}(\lambda)$, $\bar{y}(\lambda)$, and $\bar{z}(\lambda)$ input from the color matching function storage unit 74 within a range between the transition wavelengths SNM and LNM set by the short and long wavelength setting units 72 and 73 according to formulas (1), and outputting tri-stimulus values Xt, Yt, and Zt.

Reference numeral 76 denotes a comparator c for comparing the stimulus value Y input from the color conversion unit c71 with the stimulus value Yt input from the colorimetric value calculation unit 75, and selecting and outputting Yt closest to Y.

Reference numeral 77 denotes a color conversion unit d for receiving the stimulus value Yt from the comparator c76 and the stimulus values Xt and Zt from the colorimetric value calculation unit 75, and calculating and outputting chromaticities $a_t^*$ and $b_t^*$ according to formulas (2).

Reference numeral 78 denotes a hue calculation unit b for receiving the chromaticities $a_t^*$ and $b_t^*$ from the color conversion unit d77, and calculating and outputting a hue $\theta_t$ according to formulas (3).

Reference numeral 79 denotes a comparator d for comparing the hue $\theta_t$ input from the hue calculation unit b78 with the hue $\theta$, and selecting and outputting $\theta_t$ closest to $\theta$.

Reference numeral 80 denotes a saturation calculation unit b for receiving the chromaticities $a_t^*$ and $b_t^*$ from the color conversion unit d77 and the hue $\theta_t$ from the comparator d79, and calculating and outputting a saturation $\gamma_t$ according to formulas (3).

More specifically, the color reproduction range calculation unit a5 converts the lightness L* of the input color signals into a stimulus value Y, finds out long transition wavelengths respectively corresponding to short transition wavelengths 380 to 780 nm, calculates tri-stimulus values Xt, Yt, and Zt, and converts them into the chromaticities $a_t^*$ and $b_t^*$. Also, the unit a5 finds out a hue $\theta_t$ closest to the hue $\theta$ of the input signals, and calculates a saturation $\gamma_t$ from the chromaticities $a_t^*$ and $b_t^*$ which provide the hue $\theta_t$. In this manner, the color reproduction range calculation unit a5 calculates a theoretical color reproduction range $\gamma_t$ corresponding to the lightness L* and the hue $\theta$ of the input color signals.

Figure 8:
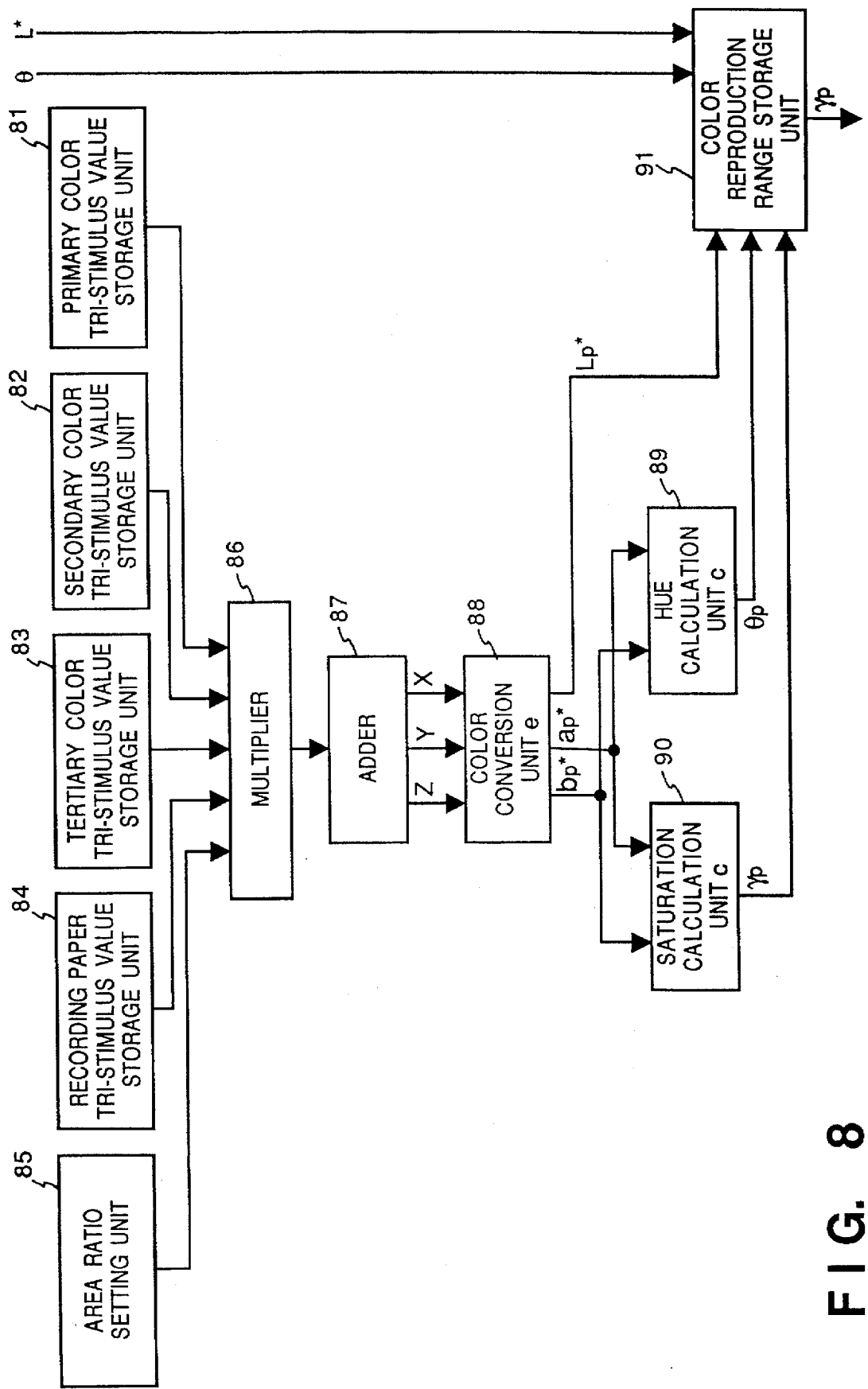
FIG. 8 is a block diagram showing an arrangement of a color reproduction range calculation unit b6 shown in FIG. 1.

FIG. 8 is a block diagram showing an arrangement of the color reproduction range calculation unit b6.

Referring to FIG. 8, reference numerals 81 to 83 respectively denote primary, secondary, and tertiary color tri-stimulus value storage units for storing tri-stimulus values of three kinds of inks, i.e., cyan, magenta, and yellow inks. The primary color tri-stimulus value storage unit 81 stores tri-stimulus values X1, Y1, and Z1 of primary colors (cyan, magenta, and yellow). The secondary color tri-stimulus value storage unit 82 stores tri-stimulus values X2, Y2, and Z2 of secondary colors (red, green, and blue). The tertiary color tri-stimulus value storage unit 83 stores tri-stimulus values X3, Y3, and Z3 of a tertiary color (black). Reference numeral 84 denotes a recording paper tri-stimulus value storage unit for storing tri-stimulus values Xp, Yp, and Zp of recording paper.

Reference numeral 85 denotes an area ratio setting unit for changing an area ratio (0 to 1.0) stepwise.

Reference numeral 86 denotes a multiplier; and 87, an adder. The multiplier 86 and the adder 87 receive the tri-stimulus values from the tri-stimulus value storage units 81 to 84 and the area ratio from the area ratio setting unit 85, and calculate and output tri-stimulus values X, Y, and Z of all the colors reproduced by three kinds of inks, i.e., cyan, magenta, and yellow inks on recording paper according to formulas (4).

Reference numeral 88 denotes a color conversion unit e for converting the tri-stimulus values X, Y, and Z input from the adder 87 into color signals $L_p^*$, $a_p^*$, and $b_p^*$ according to formulas (2).

Reference numeral 89 denotes a hue calculation unit c; and 90, a saturation calculation unit c. The units c89 and c90 respectively calculate and output a hue $\theta_p$ and a saturation $\gamma_p$ from chromaticities $a_p^*$ and $b_p^*$ input from the color conversion unit e88. More specifically, the output $\gamma_p$ from the saturation calculation unit c90 becomes the maximum saturation with respect to the lightness $L_p^*$ and the hue $\theta_p$.

Reference numeral 91 denotes a color reproduction range storage unit for storing the lightness $L_p^*$ input from the color conversion unit e88, the hue $\theta_p$ input from the hue calculation unit c89, and the saturation $\gamma_p$ input from the saturation calculation unit c90 in correspondence with each other, and outputting the saturation $\gamma_p$ corresponding to the lightness L* and the hue $\theta$ input to the color reproduction range calculation unit b6.

A difference in processing depending on the type or model of a receiving or transmitting device in a transmitting or receiving device will be explained below.

Figure 9:
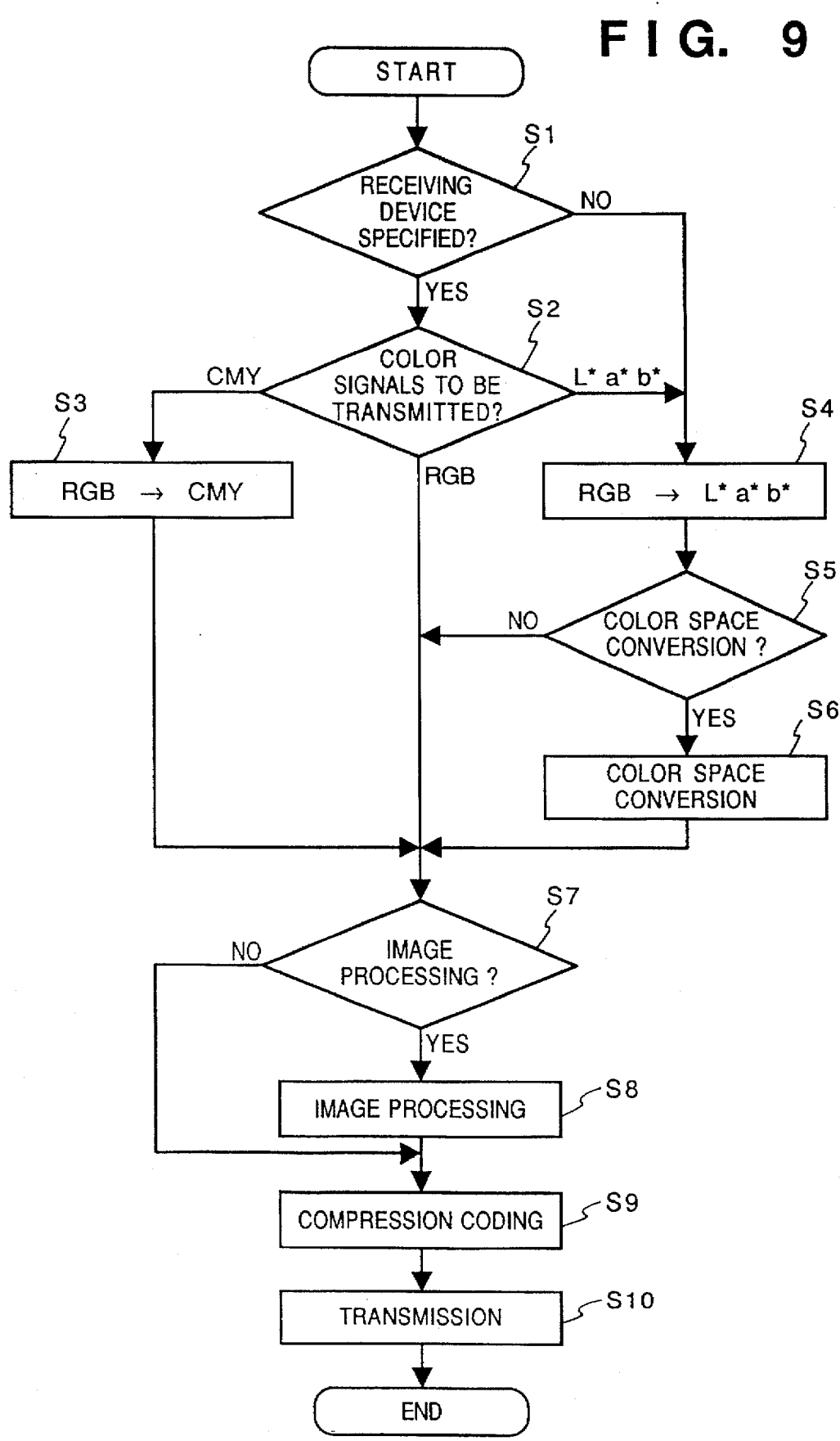
FIG. 9 is a flow chart showing a processing sequence in a transmitting device in this embodiment.

FIG. 9 is a flow chart showing a processing sequence in a transmitting device of this embodiment.

In step S1, the transmitting device checks based on information from a communication controller if a receiving device can be specified. If YES in step S1, the flow advances to step S2; otherwiser the flow advances to step S4.

If the receiving device can be specified, the transmitting device determines color signals to be transmitted according to the receiving device in step S2. If the transmitting device determines to transmit CMY signals, the flow advances to step S3; if it determines to transmit RGB signals without any conversions, the flow advances to step S7; and if it determines to transmit L*a*b* signals, the flow advances to step S4.

As a case wherein the CMY signals are transmitted, for example, a case wherein color processing is executed by the transmitting device so as to eliminate the load on the receiving device may be considered. In this case, the transmitting device converts the RGB signals into the CMY signals in step S3.

As a case wherein the RGB signals are transmitted, for example, a case wherein the receiving device has a function superior to that of the transmitting device, and can execute RGB→CMY conversion with higher precision may be considered.

Furthermore, as a case wherein the L*a*b* signals are transmitted, for example, a case wherein the transmitting devices wants to transmit signals according to a standard procedure even when the receiving device is specified may be considered. Also, in a case wherein the receiving device cannot be specified, the transmitting device converts the RGB signals into the L*a*b* signals in step S4.

Only when the L*a*b* signals are transmitted, the transmitting device checks in step S5 if color space conversion is to be executed. If YES in step S5, the transmitting device executes conversion in step S6, and thereafter, the flow advances to step S7; otherwise, the flow jumps to step S7. In this case, the color space conversion means color space compression or expansion for correcting a difference in color reproduction range between the transmitting and receiving devices.

Subsequently, the transmitting device checks in step S7 if image processing is to be performed for the color signals converted into the CMY or L*a*b* signals or the non-converted RGB color signals according to respective situations. If YES in step S7, the flow advances to step S8; otherwise, the flow jumps to step S9.

When image processing is to be performed, the transmitting device executes image processing such as binary conversion, enlargement, reduction, resolution conversion, and the like in step S8, and thereafter, the flow advances to step S9.

The transmitting device executes compression coding of the color signals in step S9, and transmits the encoded data to the receiving device in step S10.

Figure 10:
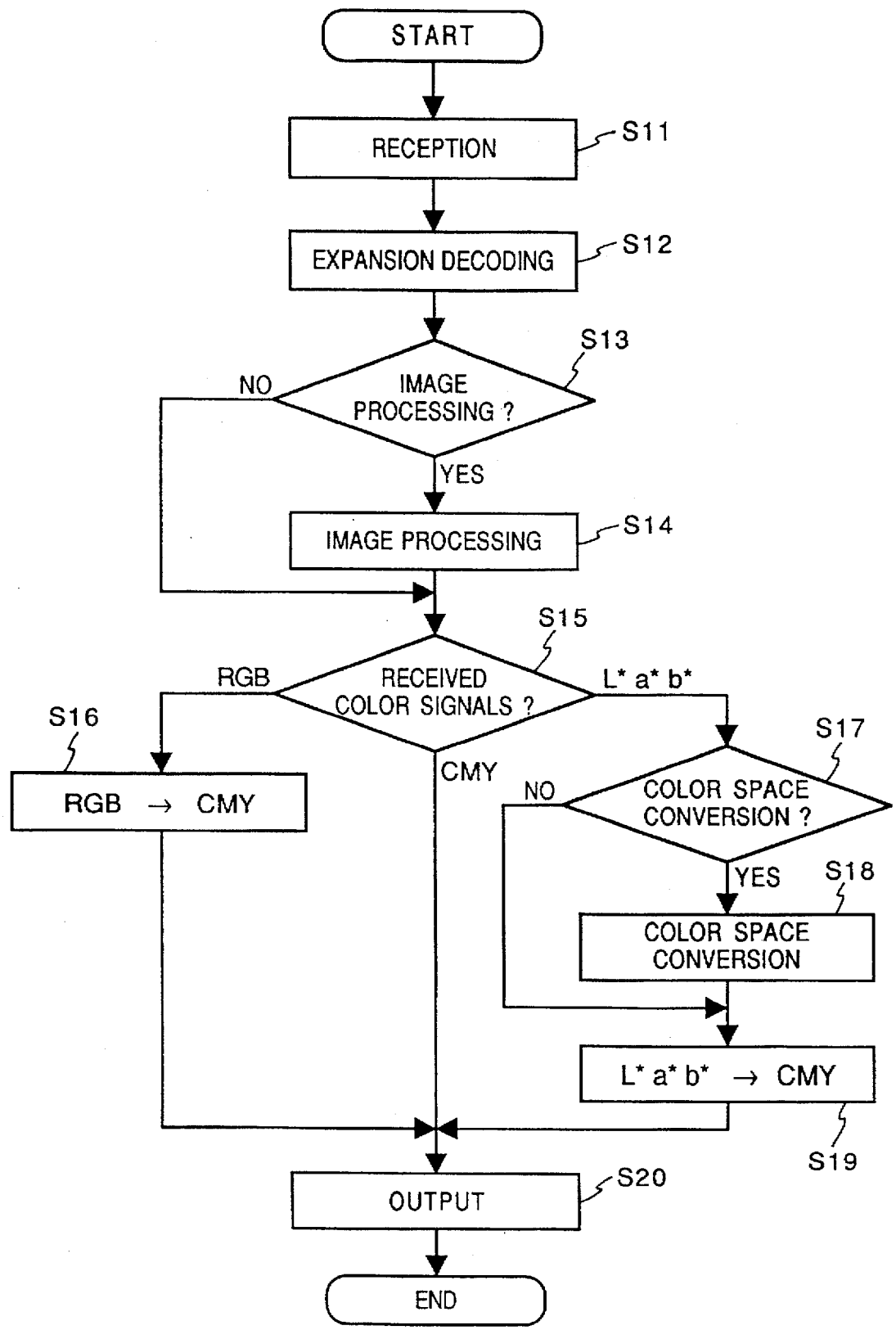
FIG. 10 is a flow chart showing a processing sequence in a receiving device in this embodiment.

FIG. 10 is a flow chart showing a processing sequence in a receiving device of this embodiment.

Referring to FIG. 10, the receiving device receives data from a transmitting device in step S11, executes expansion decoding of the received data in step S12, and checks in step S13 if image processing is to be performed for the decoded color signals. If YES in step S13, the flow advances to step S14; otherwise, the flow jumps to step S15.

When image processing is to be performed, the receiving device executes image processing such as binary conversion, enlargement, reduction, resolution conversion, and the like in step S14, and thereafter, the flow advances to step S15.

As described above, data transmitted from the transmitting device is CMY, RGB, or L*a*b* signals depending on the types or functions of the two devices. Thus, the receiving device discriminates the type of color signals in step S15. If the CMY signals are input, the flow jumps to step S20; if the RGB signals are input, the flow advances to step S16; and if the L*a*b* signals are input, the flow advances to step S17.

When the RGB signals are input, the receiving device executes RGB→CMY conversion in consideration of the RGB characteristics of the transmitting device and its own characteristics in step S16, and the flow then advances to step S20.

When the L*a*b, signals are input, the receiving device checks in step S17 if color space conversion is to be executed. If YES in step S17, the conversion is executed in step S18, and thereafter, the flow advances to step S19; otherwise, the flow jumps to step S19.

Subsequently, the receiving device executes L*a*b*→CMY conversion in step S19, and thereafter, the flow advances to step S20.

The receiving device then outputs an image expressed by the CMY signals in step S20.

As described above, according to this embodiment, the processing sequence in each device is changed depending on the types or functions of the transmitting and receiving devices, or needs at that time.

In the above description, the color reproduction range calculation unit a5 calculates a saturation $\gamma_t$ in units of input color signals. However, the color reproduction range calculation unit a5 may be partially or entirely replaced with a memory for storing saturations $\gamma_t$ calculated in advance. The calculation interval of the color reproduction range calculation unit a5 is not limited to 1 nm, but may be, e.g., 5 nm or 10 nm according to calculation precision or the number of gray scale levels or the resolution of the output device.

In the above description, upon calculation of a device independent color reproduction range, an ideal object color is defined as a color constituted by "a region where the spectral reflectance is 0" and "a region where the spectral reflectance is 1.0", as shown in FIG. 13A or 13B. However, the present invention is not limited to this. For example, an object color may be a color in which a portion where the spectral reflectance changes from 0 to 1.0 or vice versa has a given inclination T, as shown in FIG. 16A or 16B.

Figure 16A:
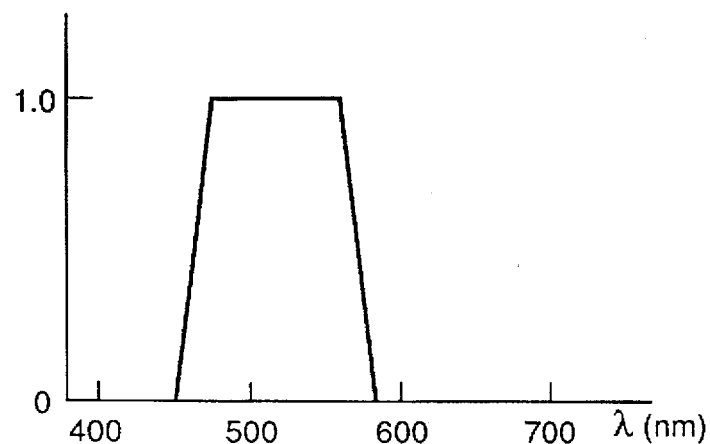
FIGS. 16A and 16B are graphs showing spectral reflectance characteristics that provide a high-saturation color.
Figure 16B:
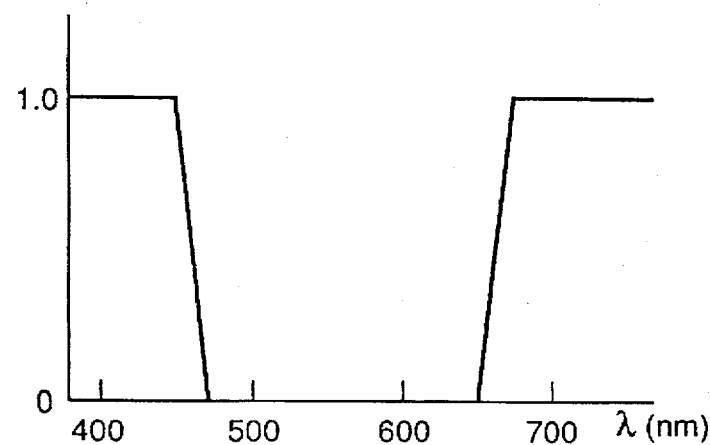

Since a color having spectral characteristics shown in FIG. 13A or 13B does not exist in practice, a color with high practicability can be set by changing the spectral reflectance with the inclination T, as shown in FIG. 16A or 16B. When a device independent color reproduction range is calculated in practice, an experimentally or theoretically obtained inclination T is set in advance, and the color reproduction range can be calculated by the same method as described above.

Figure 17:
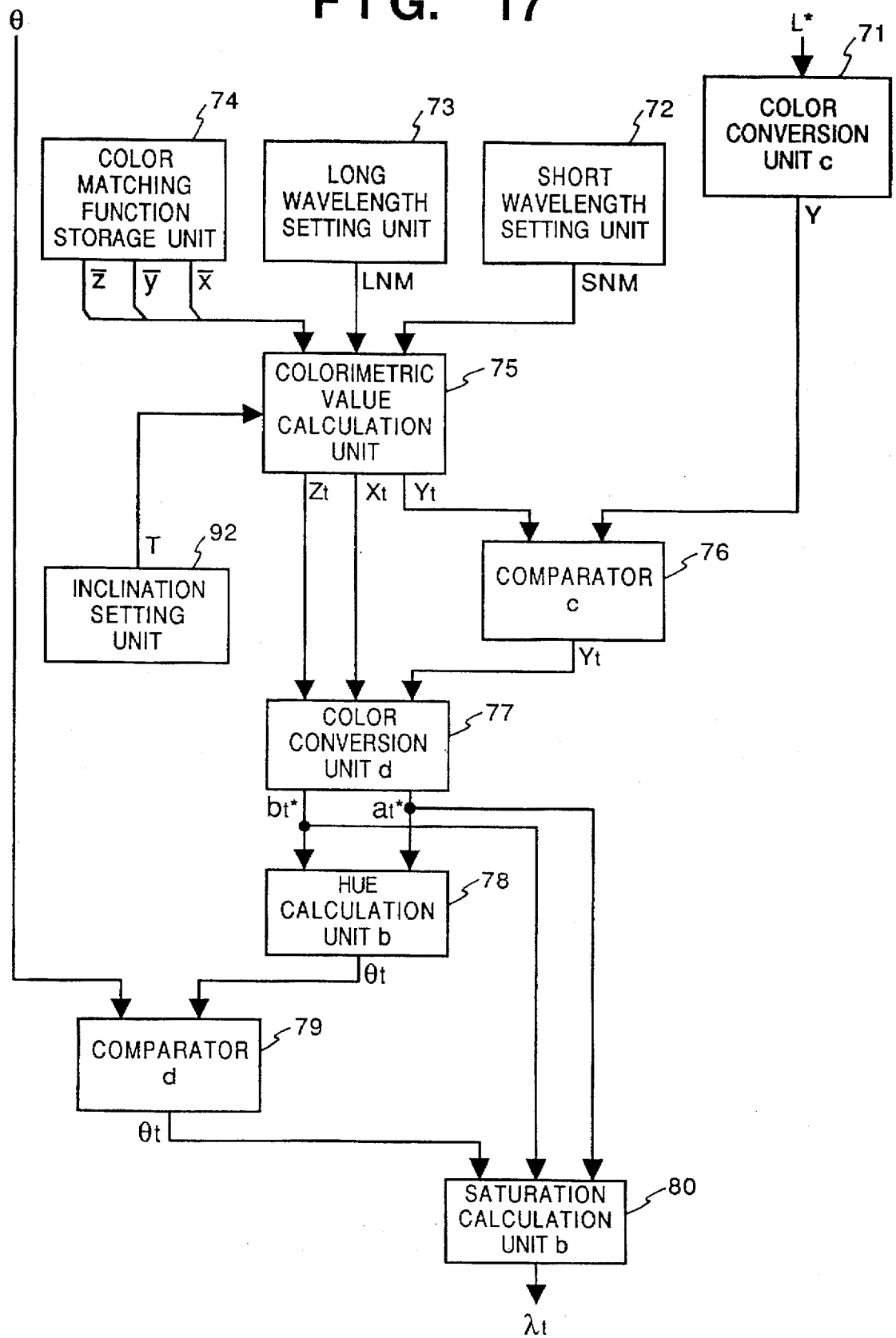
FIG. 17 is a block diagram showing another arrangement of the color reproduction range calculation unit a5 shown in FIG. 1.

FIG. 17 is a block diagram showing an arrangement of the color reproduction range calculation unit a5 in this case. A difference from FIG. 7 is that an "inclination setting unit 92" for setting the inclination T is added.

Figure 18:
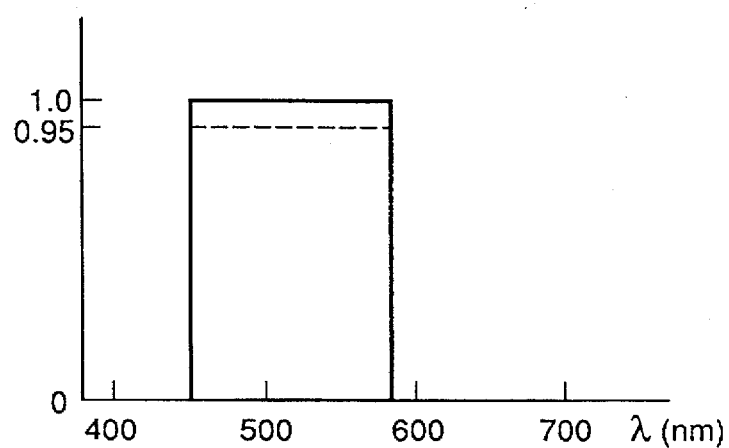
FIGS. 18A and 18B are graphs showing spectral reflectance characteristics that provide a high-saturation color.
Figure 18:
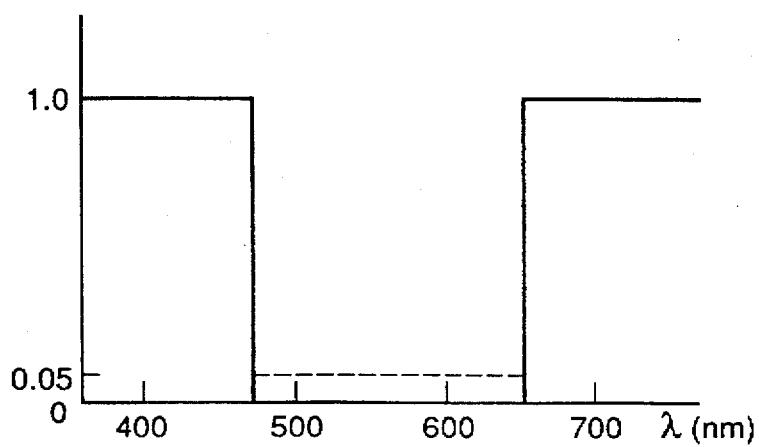

Furthermore, the spectral reflectance distribution shown in FIG. 13A or 13B may be set by fixing "the region where the spectral reflectance is 0" and changing the value of "the region where the spectral reflectance is 1.0" to 0.95, as indicated by a dotted line shown in FIG. 18A, or by fixing "the region where the spectral reflectance is 1.0" and changing the value of "the region where the spectral reflectance is 0" to 0.05, as indicated by a dotted line shown in FIG. 18B. This change amount may be experimentally or theoretically obtained and set, and is not particularly limited. When the spectral reflectance is changed in this manner, a color with high practicability can be set. Note that the method of calculating a color reproduction range in this case is the same as that described above.

In the above description, the CIE1976 L*a*b* uniform color space is used as a uniform color space. However, the present invention is not limited to this. For example, a CIE1976 L*u*v* color space may be used. Furthermore, any other color spaces may be used as long as they match with visual characteristics of man such that a distance on the color space corresponds to a color difference.

A color reproduction range stored in the color reproduction range calculation unit b6 is not limited to one output device. For example, color reproduction ranges calculated in correspondence with a plurality of output devices may be stored, and may be selectively used according to an output device. In addition, the present invention is not limited to the recording model shown in FIG. 15, and any other models may be adopted as long as they can derive a color reproduction range using characteristics of output media (e.g., inks of a printer, light-emitting elements of a CRT, or the like) of a device.

In the above description, the four methods of compressing only a saturation $\gamma$ in the color space conversion unit 8 have been exemplified. However, the present invention is not limited to these methods, and any other compression methods may be adopted.

As described above, according to the present invention, when an output device outputs a color image, image qualities (color reproducibilities) of input and output images can be matched by executing image processing including color space conversion. In addition, when a color outside a color reproduction range of an output device is to be output, a satisfactory output which preserves gradation characteristics can be obtained.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising:

an input step of inputting color image data obtained by an input device;

a first calculating step of calculating a first color reproduction range which is independent of devices in accordance with visual characteristics of a human eye;

a second calculating step of calculating a second color reproduction range which is dependent on an output device which reproduces an image;

a conversion step of executing a color space conversion on the color image data so that the converted color image data is within said second color reproduction range, in accordance with said first color reproduction range; and an output step of outputting the color image data on which the color space conversion is executed, to said output device, wherein said first calculating step performs the calculation of the most vivid color in each of lightness and hue.

2. The method according to claim 1, wherein said first color reproduction range is calculated based on color matching functions $\bar{x}(\lambda)$, $\bar{y}(\lambda)$, and $\bar{z}(\lambda)$ of the CIE (Commission international de l'Eclairage), a color constituted by a region where a spectral reflectance is 0 and a region where a spectral reflectance is 1.0, and a light source having a spectral emissivity of 1.0.

3. The method according to claim 1, wherein said first color reproduction range is calculated based on color matching functions $\bar{x}(\lambda)$, $\bar{y}(\lambda)$, and $\bar{z}(\lambda)$ of the CIE (Commission International de l'Eclairage), a color constituted by a region where a spectral reflectance is 0, a region where a spectral reflectance changes from 0 to 1.0, and a region where a spectral reflectance is 1.0, and a light source having a spectral emissivity of 1.0.

4. The method according to claim 1, wherein said first color reproduction range is calculated based on color matching functions $\bar{x}(\lambda)$, $\bar{y}(\lambda)$, and $\bar{z}(\lambda)$ of the CIE (Commission International de l'Eclairage), a color constituted by a region where a spectral reflectance is 0 or 1.0 and a region where a spectral reflectance is $\beta$ ($0<\beta<1.0$), and a light source having a spectral emissivity of 1.0.

5. The method according to claim 1, wherein said first color reproduction range is calculated in units of lightnesses and hues in uniform perceptual color space.

6. The method according to claim 1, wherein said second color reproduction range is calculated according to characteristics of output media of said output device.

7. The method according to claim 6, wherein said second color reproduction range is calculated in units of lightnesses and hues in a uniform perceptual color space.

8. The method according to claim 1, wherein the color space conversion is executed in units of lightnesses and hues in a uniform perceptual color space.

9. The method according to claim 8, wherein the color space conversion is to convert a saturation of one color reproduction range to a saturation at an outermost edge of the other color reproduction range by compressing the saturation of the one color reproduction range with a constant lightness and hue.

10. The method according to claim 8, wherein the color space conversion is to linearly compress a saturation at a compression ratio corresponding to a ratio of said first color reproduction range to said second color reproduction range.

11. The method according to claim 8, wherein the color space conversion is a nonlinear compression of a saturation by increasing a compression ratio as the saturation has a larger color space distance from a white point.

12. The method according to claim 8, wherein the color space conversion is to leave unchanged a color present within a range of $\alpha\%$ of a distance from a center (white point) of said second color reproduction range to an outermost edge, and to linearly compress a saturation of a color outside the range.

13. The method according to claim 12, wherein the range of $\alpha\%$ satisfies $0\%<\alpha<100\%$.

14. An image processing apparatus comprising:

input means for inputting color image data obtained by an input device;

first calculation means for calculating a first color reproduction range which is independent of devices in accordance with visual characteristics of a human eye;

second calculation means for calculating a second color reproduction range which is dependent on an output device which reproduces an image;

conversion means for executing a color space conversion on the color image data so that the converted color image data is within said second color reproduction range, in accordance with said first color reproduction range; and output means for outputting the color image data on which the color space conversion is executed, to said output device, wherein said first calculation means performs the calculation of the most vivid color in each of lightness and hue.

15. The apparatus according to claim 14, wherein said first calculation means calculates said first color reproduction range on the basis of color matching functions $\bar{x}(\lambda)$, $\bar{y}(\lambda)$, and $\bar{z}(\lambda)$ of the CIE (Commission International de l'Eclairage), a color constituted by a region where a spectral reflectance is 0 and a region where a spectral reflectance is 1.0, and a light source having a spectral emissivity of 1.0.

16. The apparatus according to claim 14, wherein said first calculation means calculates said first color reproduction range on the basis of color matching functions $\bar{x}(\lambda)$, $\bar{y}(\lambda)$, and $\bar{z}(\lambda)$ of the CIE (Commission International de l'Eclairage), a color constituted by a region where a spectral reflectance is 0, a region where a spectral reflectance changes from 0 to 1.0, and a region where a spectral reflectance is 1.0, and a light source having a spectral emissivity of 1.0.

17. The apparatus according to claim 14, wherein said first calculation means calculates said first color reproduction range on the basis of color matching functions $\bar{x}(\lambda)$, $\bar{y}(\lambda)$, and $\bar{z}(\lambda)$ of the CIE (Commission International de l'Eclairage), a color constituted by a region where a spectral reflectance is 0 or 1.0, and a region where a spectral reflectance is $\beta$ ($0<\beta<1.0$), and a light source having a spectral emissivity of 1.0.

18. The apparatus according to claim 14, wherein said first calculation means calculates said first color reproduction range in units of lightnesses and hues in a uniform perceptual color space.

19. The apparatus according to claim 14, wherein said second calculation means calculates said second color reproduction range according to characteristics of output media of said output device.

20. The apparatus according to claim 19, wherein said second calculation means calculates said second color reproduction range in units of lightnesses and hues in a uniform perceptual color space.

21. The apparatus according to claim 14, wherein said conversion means executes the color space conversion in units of lightnesses and hues in a uniform perceptual color space.

22. The apparatus according to claim 21, wherein said conversion means converts a saturation of one color reproduction range to a saturation at an outermost edge of the other color reproduction range by compressing the saturation of the one color reproduction range with a constant lightness and hue.

23. The apparatus according to claim 21, wherein said conversion means linearly compresses a saturation at a compression ratio corresponding to a ratio of said first color reproduction range to said second color reproduction range.

24. The apparatus according to claim 21, wherein said conversion means a nonlinear compression of a saturation by increasing a compression ratio as the saturation has a larger color space distance from a white point.

25. The apparatus according to claim 21, wherein said conversion means leaves unchanged a color present within a range of $\alpha\%$ of a distance from a center (white point) of said second color reproduction range to an outermost edge, and linearly compresses a saturation of a color outside the range.

26. The apparatus according to claim 25, wherein the range of $\alpha\%$ satisfies $0\%<\alpha<100\%$.

27. An image processing apparatus for executing color space compression processing on image data of a target image, comprising:

calculation means for calculating a color gamut of an output apparatus in accordance with primary color values and secondary color values of said output apparatus; and color space compression means for converting said image data into data which is within the calculated color gamut in accordance with a color space compression method.

28. The apparatus according to claim 27, further comprising:

mode setting means for setting an arbitrary color space compression mode from a plurality of modes corresponding to the color space compression methods which differ from each other, wherein said color space compression means performs the conversion in accordance with the mode set by said mode setting means.

29. The apparatus according to claim 28, wherein the color space compression methods includes a color space compression method of performing a linear compression.

30. The apparatus according to claim 28, wherein the color space compression methods includes a color space compression method of performing a nonlinear compression.

31. The apparatus according to claim 28, wherein the color space compression methods includes a color space compression method of performing a region compression, the region compression performing no compression on image data which is within the calculated color gamut and performing compression on image data which is not within the calculated color gamut.

32. The apparatus according to claim 28, wherein the color space compression methods includes a color space compression method of performing a mapping of the image data onto a boundary of the calculated color gamut, the boundary indicative of the same hue as the image data.

33. The apparatus according to claim 27, wherein said color space compression means performs a processing successive to a processing of said calculation means.

34. The apparatus according to claim 27, wherein said calculating means calculates the color gamut in accordance with the primary color values, the secondary color values, tertiary color values and tri-stimulus values of a recording medium.

35. The apparatus according to claim 27, wherein said calculating means is capable of varying calculation precision regarding the color gamut.

36. An image processing method for executing color space compression processing on image data of a target image, comprising:

a calculating step of calculating a color gamut of an output apparatus in accordance with primary color values and secondary color values of said output apparatus; and a color space compression step of converting said image data into data which is within said calculated color gamut in accordance with a color space compression method.

37. The method according to claim 30, further comprising:

a mode setting step of setting an arbitrary color space compression mode from a plurality of modes corresponding to the color space compression methods which differ from each other, wherein said color space compression step performs the conversion in accordance with the mode set in said mode setting step.

38. The method according to claim 30, wherein said color space conversion step performs a processing successive to a processing of said calculating step.

39. An image processing apparatus comprising:

color gamut storage means for storing color gamuts corresponding to a plurality of output devices;

input means for inputting color image data of a target image;

mode setting means for setting an arbitrary color space compression mode from a plurality of modes corresponding to color space compression methods which differ from each other;

color space compression means for converting color image data into data which is within the color gamut of a prescribed output device which is stored in said color gamut storage means, based upon the color space compression method to which the set mode corresponds; and transmitting means for transmitting the converted color image data to said prescribed output device.

40. The apparatus according to claim 39, further comprising specifying means for specifying said prescribed output device based on information from a communication controller.

41. The apparatus according to claim 39, wherein the color space compression methods include a color space compression method of performing a linear compression.

42. The apparatus according to claim 39, wherein the color space compression methods include a color space compression method of performing a nonlinear compression.

43. The apparatus according to claim 39, wherein the color space compression methods include a color space compression method of performing a region compression, the region compression performing no compression on image data which is within the calculated color gamut and performing compression on image data which is not within the calculated color gamut.

44. The apparatus according to claim 39, wherein the color space compression methods include a color space compression method of performing a mapping of the image data onto a boundary of the calculated color gamut, the boundary indicative of the same hue as the image data.

45. An image processing method comprising:

a color gamut storage step of storing color gamuts corresponding to a plurality of output devices;

an input step of inputting a color image data of a target image;

a mode setting step of setting an arbitrary color space compression mode from a plurality of modes corresponding to color space compression methods which differ from each other;

a color space compression step of converting said color image data into data which is within the color gamut of a prescribed output device which is stored at said color gamut storage step, based upon the color space compression method to which the set mode corresponds; and a transmitting step of transmitting the converted color image data to said prescribed output device.

46. A color image communication apparatus comprising:

first determining means for determining a type of a receiving device;

second determining means for determining whether or not a color space compression processing is performed on input color image data;

color correction means for performing the color space compression which converts said input color image data into data which is within a color gamut of said receiving device, in accordance with determination results obtained by said first and second determining means; and transmitting means for transmitting the color-corrected color image data to said receiving device.

47. The apparatus according to claim 36, further comprising:

mode setting means for setting an arbitrary color space compression mode from a plurality of modes corresponding to color space compression methods which differ from each other, wherein said color space compression processing performs the conversion in accordance with the mode set by said mode setting means.

48. The apparatus according to claim 47, wherein the color space compression methods include a color space compression method of performing a linear compression.

49. The apparatus according to claim 47, wherein the color space compression methods include a color space compression method of performing a nonlinear compression.

50. The apparatus according to claim 47, wherein the color space compression methods include a color space compression method of performing a region compression, the region compression performing no compression on image data which is within the calculated color gamut and performing compression on image data which is not within the calculated color gamut.

51. The apparatus according to claim 47, wherein the color space compression methods include a color space compression method of performing a mapping of the image data onto a boundary of the calculated color gamut, the boundary indicative of the same hue as the image data.

52. A color image communication method comprising:

a first determining step of determining a type of a receiving device;

a second determining step of determining whether or not a color space compression processing is performed on input color image data;

a color correction step of performing the color space compression which converts said input color image data into data which is within a color gamut of said receiving device, in accordance with determination results obtained at said first and second determining steps; and a transmitting step of transmitting the color-corrected color image data to said receiving device.

\* \* \* \* \*

UNITED STATES PATENT AND TRADEMARK OFFICE
CERTIFICATE OF CORRECTION

PATENT NO. : 5,742,296

DATED : April 21, 1998

INVENTORS : Osamu Yamada et al.

Page 1 of 3

It is certified that error appears in the above-identified patent and that said Letters Patent is hereby corrected as shown below:

IN TITLE PAGE

AT [56] References Cited:

"2132971 5/1990 Japan" should read --2-132971 5/1990 Japan--.

Column 1 line 5, "97/998,865" should read --07/998,865--.

COLUMN 4 line 10, "coordinat-" should read --coordinate--; and
line 11, "evalue" should read --value--.

COLUMN 6 line 11, "$Z=a_{31}R_i + a_{32}G_i + a_{23}B_i$" should read --$Z=a_{31}R_i + a_{32}G_i + a_{33}B_i$--.

COLUMN 9 line 5, "otherwiser" should read --otherwise,--; and
line 27, "devices" should read --device--.

UNITED STATES PATENT AND TRADEMARK OFFICE
CERTIFICATE OF CORRECTION

PATENT NO. : 5,742,296

DATED : April 21, 1998

INVENTORS : Osamu Yamada et al.

It is certified that error appears in the above-identified patent and that said Letters Patent is hereby corrected as shown below:

COLUMN 11 line 64,   "international" should read --International--.

COLUMN 13 line 54,   "means" should read --means executes a--.

COLUMN 14 line 19,   "includes" should read --include--;
   line 22,   "includes" should read --include--;
   line 26,   "includes" should read --include--;
   line 33,   "includes" should read --include--; and
   line 58,   "claim 30," should read --claim 36,--.

UNITED STATES PATENT AND TRADEMARK OFFICE
CERTIFICATE OF CORRECTION

PATENT NO. : 5,742,296

DATED : April 21, 1998

INVENTORS : Osamu Yamada et al.                              Page 3 of 3

It is certified that error appears in the above-identified patent and that said Letters Patent is hereby corrected as shown below:

COLUMN 15 line 1, "claim 30," should read --claim 36,--.

Signed and Sealed this

Twentieth Day of October, 1998

Attest:

BRUCE LEHMAN

Attesting Officer                    Commissioner of Patents and Trademarks